US005206884A

United States Patent [19]

Bhaskar

[11] Patent Number: 5,206,884

[45] Date of Patent: Apr. 27, 1993

[54] TRANSFORM DOMAIN QUANTIZATION TECHNIQUE FOR ADAPTIVE PREDICTIVE CODING

[75] Inventor: Bangalore R. R. U. Bhaskar, Gaithersburg, Md.

[73] Assignee: Comsat, Washington, D.C.

[21] Appl. No.: 603,104

[22] Filed: Oct. 25, 1990

[51] Int. Cl.[5] .......................... H04B 1/10; H04B 1/66

[52] U.S. Cl. ...................................... 375/34; 375/122; 341/51; 381/31

[58] Field of Search ...................... 375/27, 30, 34, 122; 381/29, 31; 358/133, 426; 341/51, 67, 76, 157; 382/42

[56] References Cited

U.S. PATENT DOCUMENTS

| | | | |
|---|---|---|---|
| 4,184,049 | 1/1980 | Crochiere et al. | 381/31 |
| 4,757,517 | 7/1988 | Yatsuzuka | 375/122 |
| 4,905,830 | 10/1990 | Barham et al. | 381/31 |
| 4,949,383 | 8/1990 | Koh et al. | 381/31 |

*Primary Examiner*—Curtis Kuntz
*Assistant Examiner*—Young Tse
*Attorney, Agent, or Firm*—Sughrue, Mion, Zinn, Macpeak & Seas

[57] ABSTRACT

A residual signal quantization technique used in the adaptive predictive coding of speech signals is based in the frequency domain. In predictive coders, a residual signal that results after redundancies are removed from the input signal using linear prediction techniques is quantized. The technique invented involves a transformation of the residual signal to the frequency domain and a quantization of the frequency domain coefficients. Further, the number of bits used to quantize each frequency coefficient is determined by an estimate of the power of the input signal at that frequency. Once the number of bits to be used for quantization is determined, the quantization noise power spectrum is shaped, and can be selectively shaped so as to form a desired reconstruction noise power distribution.

8 Claims, 5 Drawing Sheets

FIG. 5 SHAPING OF THE QUANTIZATION NOISE POWER SPECTRUM

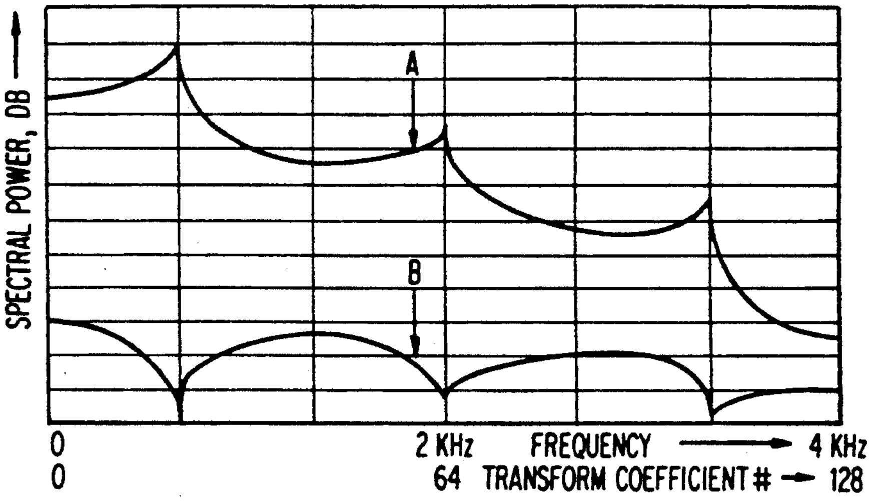

A: LPC SYNTHESIS FILTER FREQUENCY RESPONSE (SYNTHESIS GAIN)

B: QUANTIZATION NOISE SPECTRUM (DUE TO QUANTIZING THE FLAT RESIDUAL SPECTRUM, BASED ON THE BIT-ALLOCATION)

FIG. 6 BIT-ALLOCATION AS A FUNCTION OF INPUT SIGNAL POWER

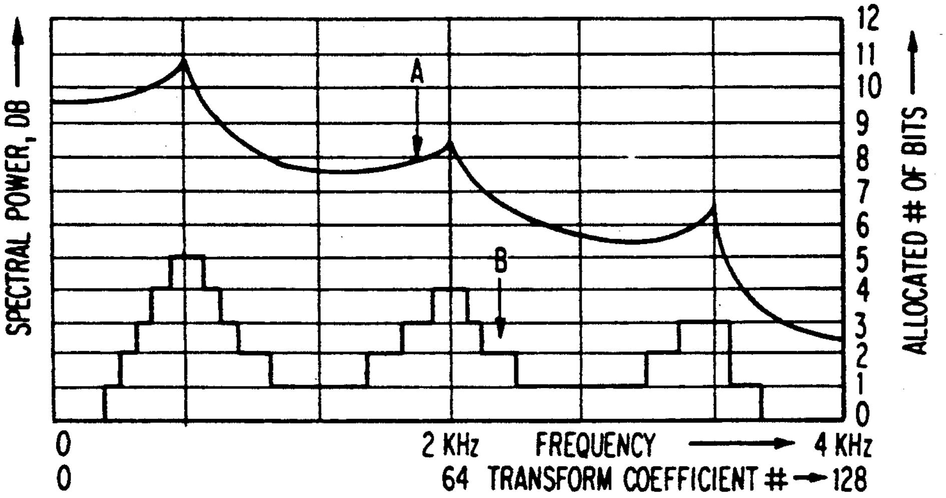

A: SIGNAL SPECTRAL POWER DISTRIBUTION

B: ALLOCATION OF BITS AMONG THE TRANSFORM COEFFICIENTS

FIG. 7 RECONSTRUCTION NOISE POWER SPECTRUM

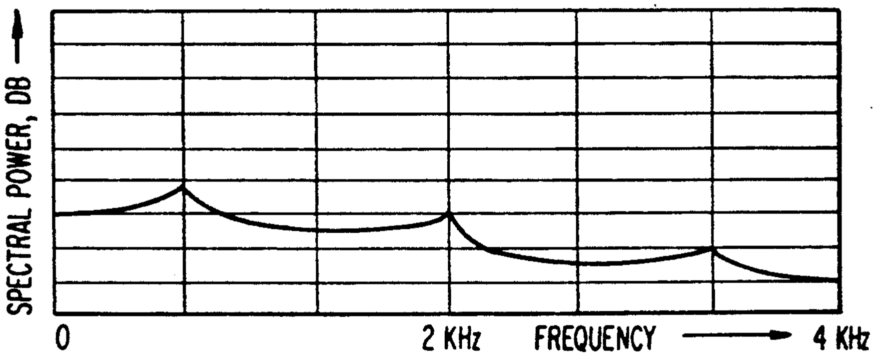

TRANSFORM DOMAIN QUANTIZATION TECHNIQUE FOR ADAPTIVE PREDICTIVE CODING

FIELD OF INVENTION

The present invention relates to digital signal transmission systems, and more specifically to digital signal transmission systems using adaptive predictive coding techniques.

BACKGROUND OF THE INVENTION

Adaptive predictive coding (APC) methods are widely used for high quality coding of speech signals at 16 kbit/s. An adaptive predictive coder digitizes an input signal by performing two basic functions: adaptive prediction and adaptive quantization. The adaptive prediction function removes the redundancies inherent in any information carrying signal such as speech. The residual nonredundant signal is then quantized by the adaptive quantization function. Various realizations of the above basic concept are possible, differing mainly in the method of residual quantization. In the most common approach, the residual nonredundant signal is quantized in the time domain, within a feedback loop. This arrangement will be referred to as the conventional APC or the APC with noise feedback (APC-NFB).

FIGS. 1 and 2 show block diagrams of the conventional encoder and decoder respectively. Since input signals such as speech have time varying characteristics, the predictor and quantizer circuits included in the adaptive predictive coder must adapt to match the time varying input signal. The conventional APC schemes are block adaptive in that the signal is processed in blocks, or frames, of samples and optimal predictor and quantizer parameters are computed for each block (frame). These parameters are also quantized and transmitted to the decoder at the receiving end of the transmission system.

In the conventional APC encoder, two stages of prediction are performed. A short term prediction circuit 4 in FIG. 1 removes redundancies by subtracting from each signal sample stored in frame buffer 1 its predicted value which is based on a predetermined number of immediately preceding samples (See L. R. Rabiner and R. W. Schafer, Digital Processing of Speech Signals, Prentice-Hall, Inc., Englewood Cliffs, N.J., 1978 and J. D. Markel and A. H. Gray Jr., Linear Prediction of Speech, Spinger-Verlag, N.Y. 1976) and is calculated by the short term prediction analysis (linear prediction coding-LPC) circuit 2 and quantized by the short term (LPC) prediction parameter quantization circuit 3. Typically 8–16 previous samples are used for predicting the present sample. The difference between the actual and the predicted samples is called the prediction error p[i]. This error displays very small short term redundancies and its variance is significantly lower than that of the input signal. For speech signals, this form of prediction has the effect of removing the formant resonances introduced by the vocal cavity.

Even though the prediction error has no short term redundancies, it may exhibit redundancies over long delays. An example is the prediction error that results during a voiced sound. The periodicity that characterizes the voiced speech signal remains in the prediction error. A long term predictor 10 removes redundancies of this nature by subtracting from each prediction error sample, output from the short term prediction circuit 4, its predicted value based on prediction error samples delayed by exactly one "period". Typically, a period value ranges over 20–147 samples and three samples are used in the prediction. This error in prediction is called the long term prediction error. The long term prediction analysis (pitch prediction analysis) circuit 8 calculates the long term predictor parameter and the long term prediction (pitch predictor) parameter quantization circuit 9 quantizes the parameter.

The long term prediction error is a highly uncorrelated signal and statistically resembles a white Gaussian noise sequence. These properties are well suited for efficient quantization.

The samples of the long term prediction error, also referred to as the residual signal r[i], are quantized by a 2 bit/sample uniform midrise quantizer 14. (See B. S. Atal, "Predictive Coding of Speech at Low Bit Rates", IEEE Trans. on Communications, Vol. Com-30, No. 4, April 1982).

An important quantity to be considered during quantization is the quantization noise q[i], which is the difference between the quantizer input w[i]- and the quantizer output r'[i]. In quantizing the residual samples r[i], it is necessary to insure that the quantization noise frequency spectrum possesses the proper power distribution. The quantization noise acts as the excitation to a synthesis filter cascade in the decoder at the receiving end of the transmission system and generates the reconstruction noise (the difference between the input and reconstructed signals). It is desirable that the reconstruction noise be white noise i.e., a flat power spectrum (as in ADPCM), or slightly resemble the signal spectrum to take advantage of a phenomenon known as auditory noise masking. This is accomplished in the conventional APC coder by summing with the residual signal r[i], a filtered version q'[i] of the quantization noise q[i], prior to quantization. (See N. S. Jayant and P. Noll, Digital Coding of Waveforms, Prentice-Hall, Inc., Englewood Cliffs, N.J., 1984). A Noise Spectral Shaping Filter 16 performs the required filtering. The filter 16 transfer function is closely related to the transfer functions of the short term and long term predictors discussed above.

The short term predictor 4 transfer function can be expressed as $$S[z] = 1 - A[z] = 1 - \sum_{m=1}^{M} a[m]\, z^{-m}$$

where M is the short term prediction order and $\{a[m], 1 \leq m \leq M\}$ are the Linear Prediction Coding (LPC) coefficients. The long term predictor 10 transfer function can be expressed as $$L[z] = 1 - C[z] = 1 - \sum_{m=p-1}^{p+1} c[m]\, z^{-m}$$

where p is the period and $\{c[m], p-1 \leq m \leq p+1\}$ are the long term prediction parameters. Then, the desired spectral shaping is accomplished by using a feedback filter 16 with the transfer function F[z] given by $$F[z] = (1 - C[z])A[z/\beta] + C[z]$$

where $\beta$ is a constant to control residual spectral shaping to thereby control auditory noise masking. $\beta$ usually assumes a value between 0.7 and 0.9.

A decoder shown in FIG. 2 reconstructs the signal based on the received long term residual signal and the predictor parameters. The predictor parameters are decoded by pitch decoder 23 and LPC decoder 24 and essentially contain information about the redundancies that must be reintroduced into the prediction error signal to reconstruct the signal. First, the long term synthesizer 25 which is the inverse of the long term predictor 10, replaces the long term redundancies. Then, the short term synthesizer 28, whose transfer function is the inverse of that of the short term predictor 4, reintroduces the short term correlations. The output of the short term synthesizer is the reconstructed signal.

The noise feedback quantization technique used in the conventional APC shown in FIGS. 1 and 2 has two main disadvantages. First, as a result of the noise feedback, the variance of the signal at the quantizer input is higher than that of the residual signal. Since a 2-bit/-sample quantizer is being used, this differential can be substantial. This results in higher reconstruction noise variance. Secondly, the feedback loop may become unstable if the power gain through the feedback filter becomes large. For highly resonant signals such as sine waves and many voiced speech signal frames, the gain of the noise feedback can be quite high (>20 dB). If this power gain through the filter exceeds the signal to quantization noise ratio, the feedback loop may become unstable. Maintaining stable operation is possible by controlling the power gain of the filter, but this is accomplished at the expense of a loss in the overall performance of the system.

SUMMARY OF INVENTION

An object of the present invention is to solve the above-mentioned problems encountered during use of the conventional APC.

More specifically, the invention does not use a noise feedback quantization technique, as the conventional APC does. Therefore, the inventive APC does not have a variance differential between the residual signal and the quantizer input signal.

Also, the inventive APC does not experience feedback loop instability problems encountered in the conventional APC.

The present invention comprises an adaptive predictive coding method for transmitting digital signals in which digital signals are processed before being transmitted. First of all, the signals are subjected to adaptive prediction in order to remove redundancies from the signal, thus producing a residual (i.e., non-redundant) signal. Secondly, the residual signal is transformed into the frequency domain by calculating frequency domain coefficients corresponding to the residual signal. Then, the frequency domain coefficients are quantized. Finally, the quantized signal is sent to a receiving end where it is decoded and reconstructed to resemble the original digital signal.

The technique according to the present invention uses a frequency domain approach to obtaining the desired power spectrum distribution for the quantization noise and reconstruction noise, without employing feedback. This avoids the instability problems encountered in the noise feedback approach. This also implies that the variance of the signal being quantized is the same as the variance of the residual signal. The present invention allows variations in the transmission rate to be easily implemented, and a wide range of signal bandwidth/sampling rates and bit rates and their combinations are possible.

BRIEF DESCRIPTION OF THE DRAWINGS

The present invention will be more clearly understood from the following description in conjunction with the accompanying drawings, wherein:

FIG. 5 is a graph showing the power spectrum of the short term predictor synthesis filter and the quantization noise;

FIG. 6 is a graph showing the relationship between the input signal spectral power distribution and the number of bits allocated to quantize each transform coefficient; and FIG. 7 is a graph showing the reconstruction noise power spectrum.

DETAILED DESCRIPTION OF THE PREFERRED EMBODIMENTS

Figure 1:
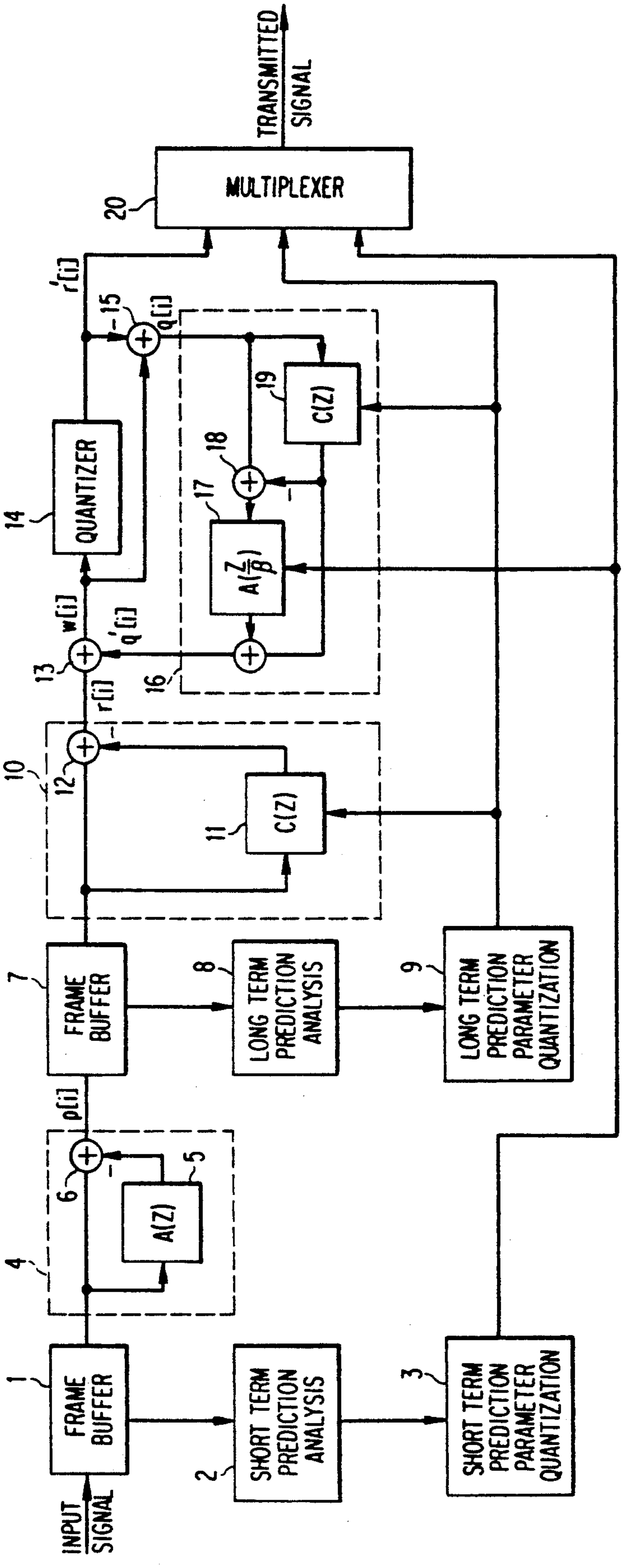
FIG. 1 PRIOR ART
FIG. 1 shows a conventional encoder using a noise feedback quantization technique
Figure 2:
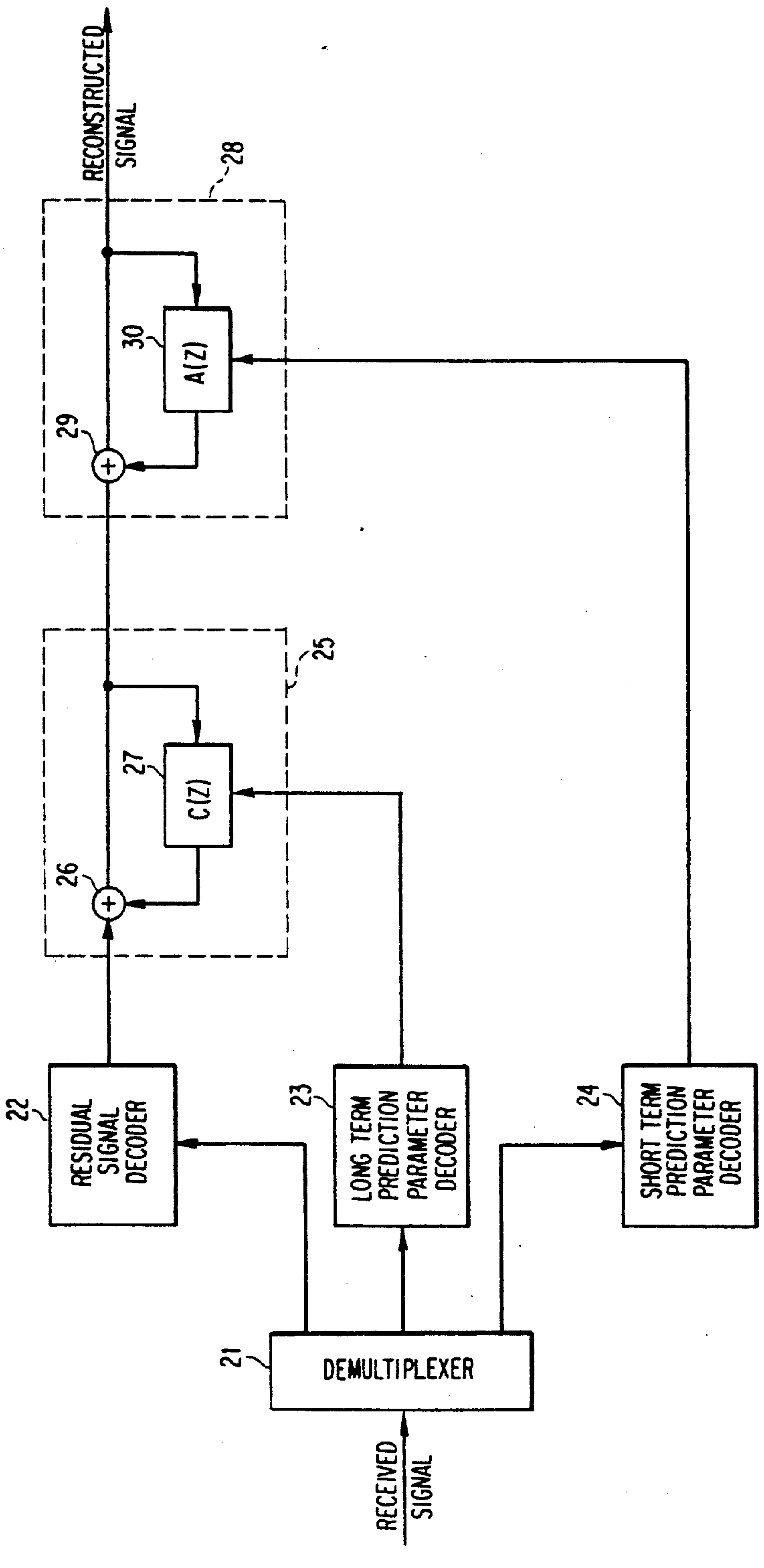
FIG. 2 PRIOR ART
FIG. 2 shows a conventional decoder corresponding to the encoder of FIG. 1.
Figure 3:
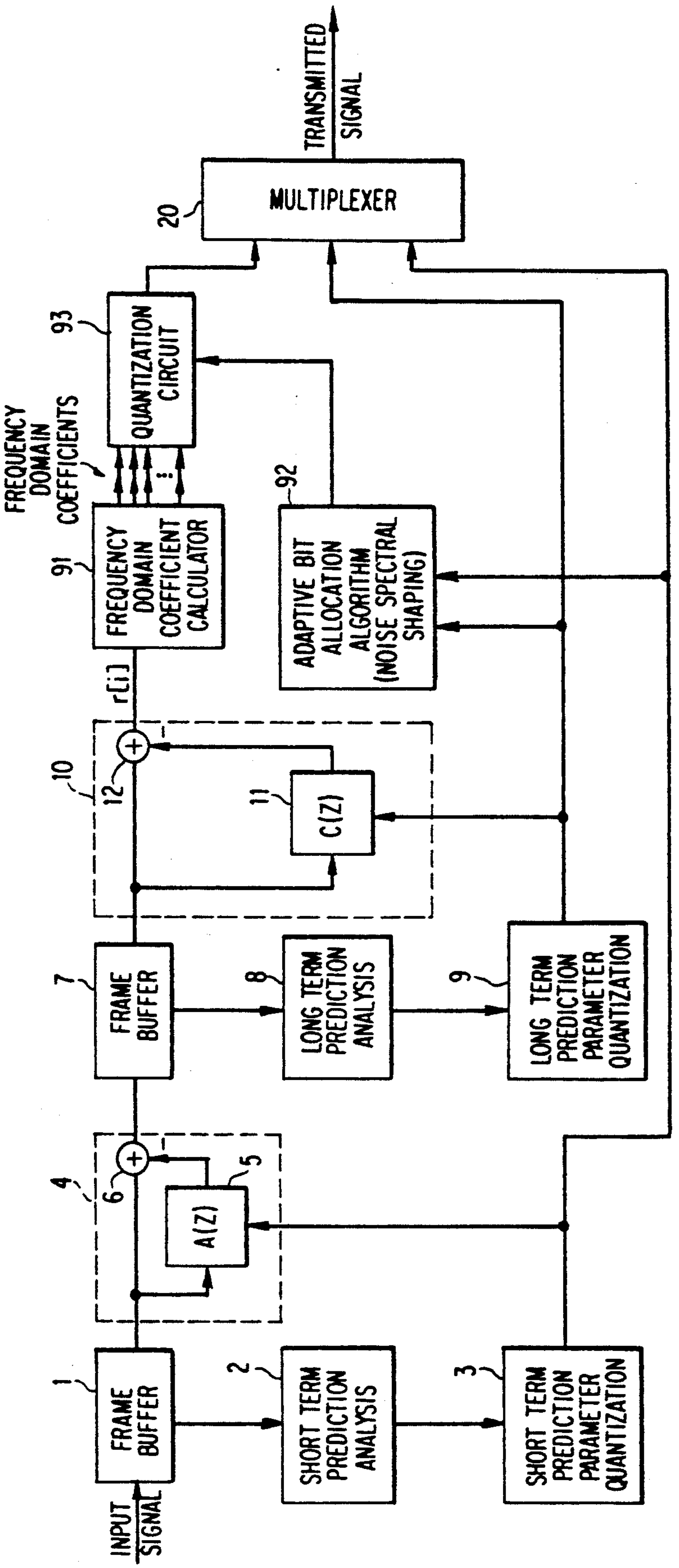
FIG. 3 shows an encoder according to the invention.
Figure 4:
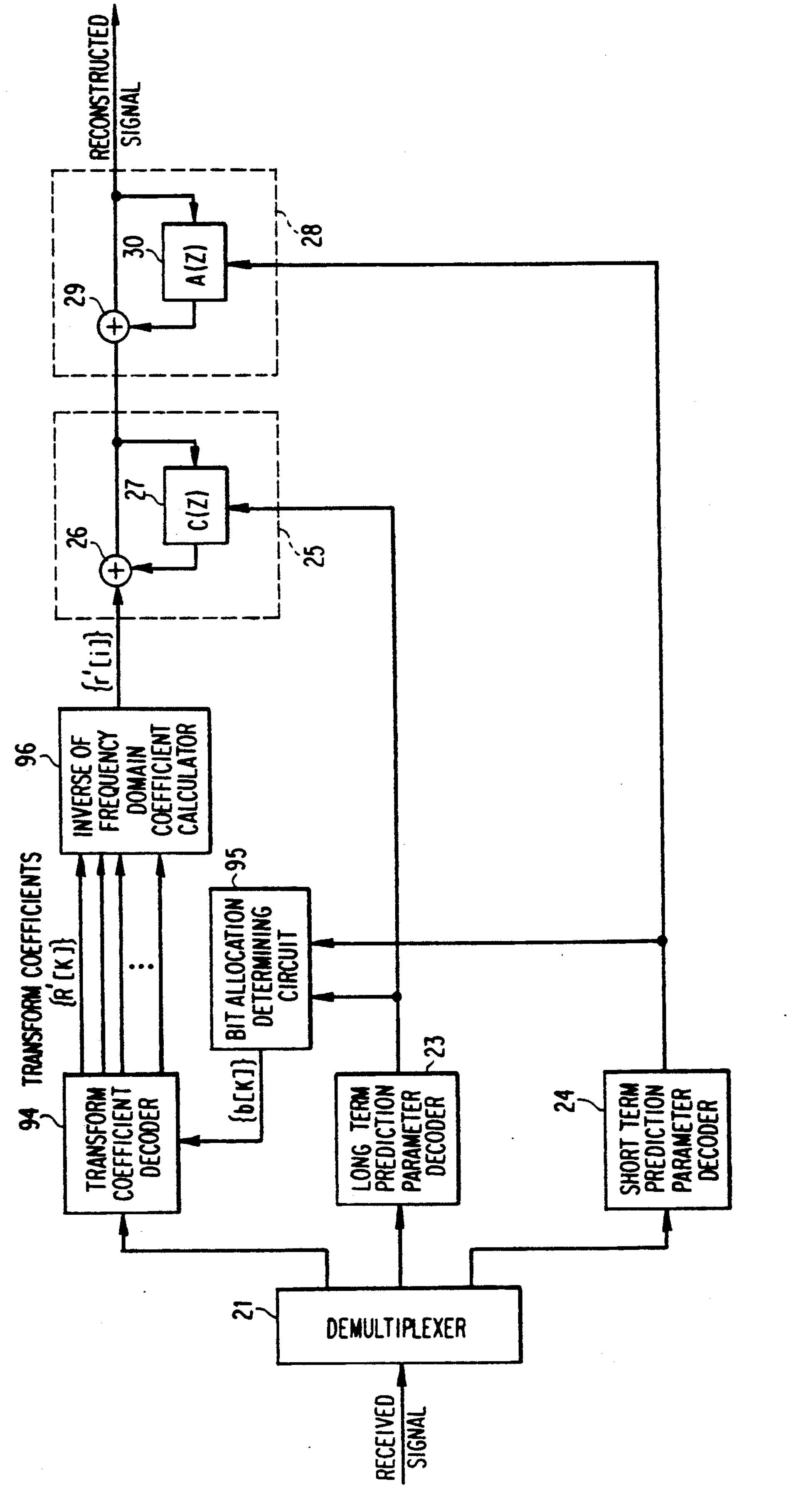
FIG. 4 shows a decoder according to the invention.

The present invention is a method of quantizing the residual signal, and is intended to replace the noise feedback quantization method used in the conventional APC encoder. The methods used for short term and long term prediction shown in FIGS. 1 and 2 are not affected. Actually, the quantization technique according to the present invention is independent of the particular approaches employed for short term and long term predictor parameter computation. Hence, the following description will focus on the quantization technique only. FIG. 3 is a block diagram of the encoder used in conjunction with the quantization technique according to the present invention. FIG. 4 is the block diagram of the associated decoder. Circuit elements identical to those in the conventional APC encoder and decoder are numbered in FIGS. 3 and 4 with the same reference numerals used in FIGS. 1 and 2, and no independent discussion of these elements will be set forth here, in order to avoid repetition.

In the embodiment shown in FIG. 3, the output of the long term predictor 1 is fed as an input to frequency domain coefficient calculator 91 where the time domain residual signal r[i]output from the long term predictor 10 is transformed to a frequency domain signal by calculating corresponding frequency domain coefficients by a known method, such as the Discrete Cosine Transformation (DCT). Quantization circuit 93 receives the calculated coefficients and quantizes them. An output of quantization circuit 93 is sent to multiplexer 20 for transmission. The quantization circuit 93 also receives an input from a noise spectral shaping circuit 92 which determines how many quantization bits should be used in quantizing each frequency coefficient according to an algorithm which will be discussed later.

It is desirable that the frame size (i.e., the number of samples held in frame buffers 1 and 7) be an integer power of 2 to obtain a computation efficient realization. For a 16 kbit/s coding rate, 128 samples/frame was found suitable. For generality, however, the frame size will be denoted by N in the following discussion.

Let {r[i], 0≦i<N} be the residual signal being encoded (i.e., the signal at the output of long term predictor 10). The residual is transformed to the frequency domain by using, for example, the Discrete Cosine Transform (DCT). The DCT of {r[i]} is also an N sample sequence {R[k], 0≦k<N) given by $$R[k] = \sum_{i=0}^{N-1} r[i]C[k]\cos\frac{(2i+1)\pi k}{2N},\ k = 0, 1 \ldots, N-1.$$

where

C[k]=1 for k =0, and

C[k]=$\sqrt{2}$ for 1<k <N. {R[k]} will be referred to as the transform coefficients. The quantization technique according to this invention quantizes the transform coefficients {(R[k]} and transmits them to the decoder. For generality, let B denote the total number of bits available to quantize the transform coefficients. At the bit rate of 16 kbit/s and frame size of 128 samples, a typical value of B is 256. The B bits are distributed non-uniformly among the N transform coefficients so that the desired quantization noise spectrum is achieved. More particularly, in quantizing the DCT coefficients, it should be taken into account that the quantized transform coefficients will be transformed back to the time domain and filtered by a cascade of long term and short term synthesis filters to reconstruct the input signal. Therefore, the quantization noise should be such that, after these filtering operations have taken place, a reconstruction noise results having a power spectrum either resembling white noise or otherwise suitably shaped for auditory noise masking.

The reconstruction noise power spectrum can be expressed as the product of the power spectra of the quantization noise, and the magnitude squared product of the long term synthesis filter transfer function and the short term synthesis filter transfer function $$Pn[jw]=Pq[jw]\,|Fl[jw]Fs[jw]|^2$$

Here, Pn[jw] and Pq[jw] are the power spectra of the reconstruction noise and quantization noise, respectively, and Fl[jw] and Fs[jw] are the transfer functions of the long and short term synthesis filters respectively. This equation implies that in order to achieve a constant reconstruction noise power spectrum, the quantization noise power spectrum must be the inverse of the squared product of the magnitudes of the long term and short term filter transfer functions long term and the short term power spectra.

The previous equation can be rewritten as $$Pq[jw] = \frac{Pn[jw]}{|Fl[jw]Fs[jw]|^2}$$

in order to make clear the above-noted implication.

In FIG. 5 the short term predictor synthesis filter 28 transfer function frequency response (synthesis gain) is plotted as Curve A. Curve B of FIG. 5 shows the desired quantization noise spectrum in order to achieve a flat reconstruction noise power spectrum. Curve B has its minimum power locations where Curve A has its maximum power locations. This is in accordance with the above stated relationship between the quantization noise and the synthesis filter transfer function spectra (i.e., the spectra should be in an inverse relation in order to obtain a flat reconstruction noise power spectrum and thus be able to take advantage of auditory noise masking techniques).

The N DCT coefficients {R[k]} may be regarded as the samples of the (cosine) spectrum of the signal {r[i]) at a set of N discrete frequencies {wk =2xk/N, k =0,1, . . ,N-1}. The long term and the short term synthesis filter transfer functions at the frequencies {wk} can be computed by the following expressions $$Fl[k] = \frac{1}{1 - \sum_{m=p-1}^{p+1} c[m]e^{-j\frac{2\pi mk}{N}}} \text{ and}$$

$$Fs[k] = \frac{1}{1 - \sum_{m=1}^{M} a[m]e^{-j\frac{2\pi mk}{N}}}$$

respectively. The desired quantization noise power spectrum is the inverse of the magnitude squared product of the long and short term synthesis filter transfer functions, $$Pq[k] = \frac{1}{|Fl[k]Fs[k]|^2}$$

or in Db.

$$Pq[k]|_{dB} = -20\log\{|Fl[k]Fs[k]|\}$$

According to the present invention, an iterative bit-allocation algorithm performs the bit distribution based on the short term and long term predictor frequency responses. The bit-allocation technique creates the desired quantization noise spectrum in the following manner: a particular transform coefficient R[k]receives more bits if it should have a smaller quantization noise power (i.e., smaller Pq[k]) or fewer bits if it should have a larger quantization noise power (i.e., larger Pq[k]). The addition (subtraction) of a bit for the quantization of R[k] decreases (increases) the quantization noise power of R[k] approximately by 6 dB. FIG. 6 shows the relationship between the spectral power P[k] of the input signal and the number of bits allocated for the quantization of each transform coefficient. As is clear from the FIG. 6, the higher the spectral power of the input signal, the more bits are needed to represent that power. The spectral power estimate P[k] of the input signal is the inverse $$P[k] = \frac{1}{Pq[k]}$$

of the quantization noise power spectrum. Thus, if it is required to increase the quantization noise power spectrum at a certain digital frequency, then it is necessary to reduce the number of quantization bits used to quantize the corresponding transform coefficient.

The noise spectral shaping circuit 92 of FIG. 3 receives the quantized long and short term prediction parameters from circuits 9 and 3, respectively. These parameters are used to construct the short term and the long term synthesis filter transfer functions $F_l[k]$ and $F_s[k]$ as specified above. From these transfer functions an estimate of the input signal power is derived. Thus, the noise spectral shaping circuit 92 is provided with an estimate of the input signal power P[k] for use in the adaptive bit allocation algorithm alluded to above, and which will be fully described below.

The above-mentioned bit allocation procedure seeks to produce a constant reconstruction noise power spectrum. As in the case of the conventional APC, however, it is also desirable to allow more noise at spectral peaks of the reconstruction noise power spectrum so that the noise at spectral valleys may be reduced, as illustrated by FIG. 7. The reconstruction noise power spectrum can be shaped by modifying the computation of Fs[k] according to the following expression:

$$F's[k] = \frac{1}{1 - \sum_{m=1}^{M} a[m]\beta^m e^{-j\frac{2\pi mk}{N}}}$$

The factor $\beta$ in the above expression allows implementation of noise masking. If $\beta=1$, the above equation reduces to the earlier expression for Fs[k], leading to a constant reconstruction noise power spectrum. For $\beta<1$, the peaks of {F's[k]} are smaller than the peaks of the short term synthesis filter response at the decoder. This results in the quantization noise power spectrum being larger than necessary to neutralize the short term filter response at the frequencies of the peaks. The overall result is that the reconstruction noise is larger at the spectral peaks of the signal. The value of $\beta$ is typically chosen in the range of 0.7–0.9.

Now, the bit allocation algorithm performed by the noise spectral shaping circuit 92 in the inventive encoder of FIG. 3 will be described. Let Pmax denote the largest value in the input signal power {P[k]}, and kmax its index, i.e., P[kmax]=Pmax. Also, let b[k] {b[k], $0 \leq k < N$} be the bit allocation, where b[k] is the number of bits allocated to quantize the transform coefficient R[k]. Note that {b[k]} must satisfy the constraint $$\sum_{k=0}^{N-1} b[k] \leq B$$

Preferably, the equality will apply so that all of the bits available will be used to quantize the transform coefficients. Let bmax and bmin respectively denote the maximum and the minimum number of bits any transform coefficient may be allocated. Typical values of bmax and bmin at 16 kbit/s are 5 and 0, respectively. In the following bit-allocation algorithm, in each pass, one bit is added to all the transform coefficients that exceed a threshold power level, PL. The threshold is initially at Pmax−6 dB. After each pass, it is decremented by 6 dB. This procedure continues until all the bits have been allocated.

The above described algorithm is, therefore, initialized using the following values.

Initialization:

PL=Pmax−6 dB b[k]=bmin, $0 \leq k < N$ btot=B−N.bmin

PL is initially set to be 6 dB less than the maximum input signal power level. All of the transform coefficients are initially set to the minimum number of bits that any transform coefficient may be allocated. Further, the total number of bits left to be allocated, btot, is initially set to the total number of available bits, B, less the total number of transform coefficients multiplied by the minimum number of bits that any one transform coefficient may have allocated to quantize it. Then, the following sequence of steps is carried out by the circuit 92 of FIG. 3.

Step 1

S={k e[0,N), P[k]>PL } i.e., S is the set of all indices k for which P[k], the input signal power level, exceeds PL. In this first step, the input signal power level P[k] of each transform coefficient is compared to the current power level, PL, and if P[k] is greater than PL then the index of the particular transform coefficient having an input power greater than PL is included in the set S of indices.

Step 2

Update the bit allocation b[k]: for k e S, if b[k]<bmax and btot >0, b[k]=b[k]+1 and btot =btot−1.

i.e., for all the indices k which satisfy P[k]>PL, if the number of bits allocated b[k] for that particular transform coefficient is less than the maximum and if the number of bits remaining to be allocated (btot) is nonzero, allocate one more bit to R[k], and decrement the number of bits remaining to be allocated.

Step 3

If btot=0, bit allocation is completed, exit. Otherwise continue to step 4.

If btot=0, then there are no more bits left to be allocated so the bit allocation algorithm is terminated.

Step 4

Update PL by PL =PL−6.

This step lowers the power level threshold so that transform coefficients having lower power levels may have bits allocated to quantize them.

The adaptive bit allocation outlined above performs the same function in the transform domain as the quantization noise feedback arrangement performs in the conventional APC. It ensures that the quantization noise power spectrum has nulls where the synthesis filter transfer functions have peaks. Using the transform domain quantization technique of this invention, however, this is accomplished nonrecursively (i.e., without feedback). Thus, the instability problems involved with feedback systems are avoided. In addition, the variance of the quantizer input is not increased by the inventive quantization technique as it is in the case of the conventional APC-NFB.

The adaptive bit allocation scheme also has other attractive properties. The bit rate can be varied easily by using a suitable value for B, the total number of bits available for quantization purposes. The wasteful use of bits at frequencies at which the signal power is known to be low (for example below 200 Hz in the case of telephone bandlimited signals) can be prevented. The transform quantization technique also allows variations in sampling rates to be easily implemented.

The number of bits allocated for the quantization of each transform coefficient {R[k]} is given by {b[k]). This value may range from bmin bmax, depending on the estimate of the power spectral density {P[K]}. The transform coefficients with 0 bit allocation cannot be transmitted and are set to zero. The remaining transform coefficients can be quantized using Max quantizers optimized for Gaussian distribution. (See J. Max, "Quantizing for Minimum Distortion," IRE Trans. on Information Theory, pp. 7-12, March 1960). The 2, 4, 8, 16 and 32 level quantizers for univariate Gaussian distribution are given in Table 1. To match the univariate quantizers to the variance of the transform coefficients, the root mean square value of all the transform coefficients {R[k]} which have non-zero bits allocated is determined and transmitted to the decoder. This is computed by $$D = \sqrt{\frac{1}{N'} \sum_{k=0}^{N-1} R^2[k]}, \quad b[k] \neq 0$$

where N' is the number of {R[k]} with non-zero bits. D can be quantized using a piecewise linearlogarithmic logarithmic characteristic using 8 bits and transmitted to the decoder. The quantizers for any frame are obtained by multiplying the values in Table 1 by the quantized value of D. The transform coefficient quantization itself is simple: for each R[k], the bit-allocation b[k] is obtained. If b[k] is zero, no information is transmitted. Otherwise, the b[k]-bit table given in Table 1 is searched to determined the input level interval which the R[k] occupies. The index for that level is transmitted.

FIG. 4 shows the decoder of the inventive transmission system located at the receiving end. At the decoder, the quantized transform coefficients are inverse transformed to the time domain sequence {r'[i]} by a circuit 96 which performs an operation which is the inverse of the frequency domain coefficient calculator operation, an example of this type of circuit is the inverse discrete cosine transform (IDCT). To obtain the quantized transform coefficients, it is necessary to obtain the bitallocation. This in turn requires decoding the short term and long term parameters using circuits 24 and 23 respectively. The bit allocation {b[k]}can then be determined by the bit allocation determining circuit 95 by following the same algorithm employed in the encoder. Since all parameters were quantized prior to use in the encoder, the bit allocation determined at the decoder is identical to that at the encoder, in the absence of bit errors. Based on the bit allocation, the variable length bit sequence representing each transform coefficient can be separated into representations of the individual coefficients. The transform coefficients can then be decoded (to within a scale factor) by a table look-up operation. By scaling the transform coefficients by the scale factor D, the quantized transform coefficients are completely determined.

Using {R'[k]} to denote the decoded transform coefficient sequence, the inverse DCT r'[i] is obtained by:

$$r'[i] = \frac{1}{N} \sum_{k=0}^{N-1} R'[k]C[k]\cos\left(\frac{(2i+1)\pi k}{2N}\right)$$

where,
C[k]=1
k=0,
$C[k]=\sqrt{2}$
0<k<N.

The reconstructed signal is obtained as in the conventional APC, by exciting the cascade of the long term 25 and the short term 28 filters by the excitation sequence {r'[i]}.

In the invented technique, the prediction residual signal is quantized in the transform domain. The discrete cosine transform is used in the preferred embodiment discussed above, but in general, any transformation to the frequency domain can be employed. A bit allocation algorithm distributes the total number of bits/frame among the frequency coefficients, depending on an estimate of the input signal power spectrum. The bit distribution controls the quantization noise power spectrum such that the reconstruction noise possesses the desired power spectrum.

TABLE 1

| | Max quantizers for Gaussian Distribution. | | | | | | | | | |
|---|---|---|---|---|---|---|---|---|---|---|
| | 1-bit quantizer | | 2-bit quantizer | | 3-bit quantizer | | 4-bit quantizer | | 5-bit quantizer | |
| j | x[j] | y[j] | x[j] | y[j] | x[j] | y[j] | x[j] | y[j] | x[j] | y[j] |
| 1 | 0.000 | 0.798 | 0.000 | 0.453 | 0.000 | 0.245 | 0.000 | 0.128 | 0.000 | 0.066 |
| 2 | | | 0.982 | 1.510 | 0.501 | 0.756 | 0.258 | 0.388 | 0.132 | 0.198 |
| 3 | | | | | 1.050 | 1.344 | 0.522 | 0.657 | 0.265 | 0.331 |
| 4 | | | | | 1.748 | 2.152 | 0.800 | 0.942 | 0.399 | 0.467 |
| 5 | | | | | | | 1.099 | 1.256 | 0.536 | 0.605 |
| 6 | | | | | | | 1.437 | 1.618 | 0.676 | 0.747 |
| 7 | | | | | | | 1.844 | 2.069 | 0.821 | 0.895 |
| 8 | | | | | | | 2.401 | 2.733 | 0.972 | 1.049 |
| 9 | | | | | | | | | 1.130 | 1.212 |
| 10 | | | | | | | | | 1.299 | 1.387 |
| 11 | | | | | | | | | 1.482 | 1.577 |
| 12 | | | | | | | | | 1.682 | 1.788 |
| 13 | | | | | | | | | 1.908 | 2.029 |
| 14 | | | | | | | | | 2.174 | 2.319 |
| 15 | | | | | | | | | 2.505 | 2.692 |
| 16 | | | | | | | | | 2.977 | 3.263 |

Note: The quantizers are symmetric about 0, so only the positive half is tabulated. If the input lies in the decision interval (x[j], x[j + 1]), it is quantized to the reconstruction level y[j].

What is claimed is:

1. An adaptive predictive coding method in which digital signals are processed before being transmitted, said method comprising the steps of:

performing adaptive prediction on said digital signals by using digital filtering;

transforming resultant digital signals from said performing step into the frequency domain by calculating frequency domain coefficients corresponding to said digital signals; and quantizing said frequency domain coefficients, in which said quantizing step is performed by using an adaptive bit allocation algorithm whereby each of said coefficients is allocated a variable number of quantization bits by (a) comparing the power level of each coefficient with a variable threshold, (b) allocating a bit to each coefficient whose power level is greater than the threshold, (c) lowering the variable threshold once all coefficients have been compared, and (d) returning to step (a) until there are not more bits left to be allocated.

2. An adaptive predictive coding method as claimed in claim 1 in which said quantizing step is performed based on digital filter parameters used in said performing step.

3. An adaptive predictive coding method as claimed in claim 1 in which said algorithm allocates quantization bits to said coefficients in accordance with the power level of said coefficients.

4. An adaptive predictive coding method as claimed in claim 3 in which said algorithm compares an estimate of the power level of each of said coefficients, said estimate being derived from said digital filter parameters, to a threshold power level and assigns a first predetermined number of quantization bits to each of said coefficients based on the results of the comparison.

5. An adaptive predictive coding method as claimed in claim 4 in which said algorithm decreases said threshold power level by a predetermined amount once all of said coefficients have been compared to a present value of said threshold power level and said algorithm repeats the comparison and decreasing until a second predetermined number of total bits available for allocation has been exhausted.

6. An adaptive predictive coding method as claimed in claim 5 in which said first predetermined number of quantization bits is equal to one.

7. An adaptive predictive coding method as claimed in claim 5 in which said second predetermined number is selectively variable so as to enable various bit rates to be used.

8. A method of obtaining a desired reconstruction noise power spectrum in a digital signal transmission environment comprising the steps of:

performing adaptive prediction on an input digital signal in order to produce a non-redundant signal in which redundancies in said input digital signal are removed;

transforming said non-redundant signal into a frequency domain signal involving frequency domain coefficients;

distributing a total number of quantization bits among said coefficients based on an input signal power spectrum thus controlling a quantization noise power spectrum in such a way that a desired reconstruction noise power spectrum results; and quantizing said coefficients using said distributed bits further characterized in that said distributing step includes the sub-steps of (a) comparing the power level of each coefficient with a variable threshold, (b) allocating a bit to each coefficient whose power level is greater than the threshold, (c) lowering the variable threshold once all coefficients have been compared, and (d) returning to step (a) until there are not more bits left to be allocated.

* * * * *